United States Patent [19]

Klein et al.

[11] 4,099,218
[45] Jul. 4, 1978

[54] METHOD OF MAKING POROUS POLYMER CONTAINING SEPARATORS FOR ELECTROLYTIC ELECTRICAL DEVICES

[75] Inventors: Gerhart P. Klein, Manchester; Ivan L. Wingood, Jr., Bedford, both of Mass.

[73] Assignee: P.R. Mallory & Co. Inc., Indianapolis, Ind.

[21] Appl. No.: 722,684

[22] Filed: Sep. 13, 1976

[51] Int. Cl.² .................... H01G 9/00; B23B 3/00
[52] U.S. Cl. .................................... 361/433; 29/570; 264/49; 429/250; 521/61
[58] Field of Search ............... 317/230; 29/570; 427/58, 79, 80; 428/306; 260/2.5 AY, 2.5 M; 264/49, DIG. 17; 429/250, 251, 253; 361/433

[56] References Cited
U.S. PATENT DOCUMENTS

| | | | |
|---|---|---|---|
| 3,020,597 | 2/1962 | Smith-Johannsen | 428/306 X |
| 3,661,645 | 5/1972 | Strier et al. | 264/49 X |
| 3,714,307 | 1/1973 | Shikada | 260/2.5 AY X |
| 3,836,829 | 9/1974 | Eustance | 260/2.5 M |
| 3,908,157 | 9/1975 | Ross et al. | 317/230 |
| 3,930,979 | 1/1976 | Vallance | 264/49 |
| 3,940,667 | 2/1976 | Pearce | 317/230 |
| 3,982,335 | 9/1976 | Cunningham et al. | 260/2.5 AY |

Primary Examiner—Stanley D. Miller, Jr.
Assistant Examiner—James W. Davie
Attorney, Agent, or Firm—Hoffmann, Meyer & Coles

[57] ABSTRACT

A method of making porous polymer containing separators adapted for use in electrolytic electrical devices, particularly electrolytic capacitors, the separator capable of absorbing and retaining electrolyte and devices utilizing the resultant separators. The method includes the steps of loading a semi-liquid or liquid polymer containing material with at least one compound and at least one modifier material, solidifying the polymer containing material, and removing at least some of the compound to provide a porous polymer containing separator capable of absorbing and retaining electrolyte. When the separators of the present invention are utilized in electrolytic capacitors, especially aluminum electrolytic capacitors, reductions in capacitor volume without significant loss of capacitance are realized and capacitor manufacture is facilitated.

22 Claims, 3 Drawing Figures

METHOD OF MAKING POROUS POLYMER CONTAINING SEPARATORS FOR ELECTROLYTIC ELECTRICAL DEVICES

The present invention relates to a method of making electrical devices and more particularly to a method of making porous polymer containing separators for separating adjacent electrodes in electrical devices.

While the method of the present invention may be adapted in the manufacture of many electrolytic electrical devices, it will be mainly discussed hereinafter with reference to electrolytic capacitors of the plate or foil electrode type. It should be understood that while the discussion is limited to these type devices for the purposes of succinctness and clarity, the present invention is not thereby so limited.

Plate or foil type electrode electrolytic capacitors generally comprise an anode electrode and cathode electrode physically separated by a separator material, the electrodes being contacted by a semi-liquid or liquid electrolyte. The most common type of electrolytic capacitor of this type is an aluminum foil electrode capacitor, the foils being in either a stacked or convolutely wound configuration. At least one of the foils has a dielectric oxide film formed thereon and the foils may be etched so as to provide a greater effective surface area.

Electrolytes for electrolytic capacitors generally comprise an ionizable solute in a suitable polar solvent. These solutes are generally salts and acids such as phosphoric acids, maleic acid, boric acid, benzoic acid and the like. Commonly used solvents include ethylene glycol, ethylene glycol based ethers and esters, water, dimethylformamide, and combinations thereof. See U.S. Pat. No. 3,931,552 for examples of electrolyte constitutents. Important characteristics of suitable electrolytes are temperature stability, low resistivity and chemical inertness to capacitor components.

The most common separator materials for electrolytic capacitors are various types of paper which are able to absorb and retain the electrolyte and thereby maintain close contact between the electrolyte and the electrode foils. Several problems are associated with the use of paper as a separator material between adjacent electrodes, both in the manufacture of the capacitor and in the resultant electrical characteristics of the capacitor. One of these problems is that paper separators have inconsistencies such as particle impurities or void type defects. At higher voltages, these inconsistencies in a capacitor separator may lead to poor DC leakage characteristics or even failure of the capacitor. Thus, more than one sheet of paper, typically from two to six sheets, is used to mask these inconsistencies so to generally achieve good electrical properties. Use of more than one sheets of paper unduly increases the size of the capacitor. In addition, in convolutely wound foil electrode capacitors, the use of multiple sheets of paper presents problems in evenly winding the electrodes and paper separators. The winding is frequently a cumbersome operation requiring the operator to exhibit a good deal of dexterity. Paper type separators also generally have poor mechanical properties and therefore may tear during assembly, especially in an automated production operation.

Polymer separators, alone or in combination with paper separators, have been used previously in electrolytic capacitors. The major problem associated with the use of polymer separators is that the electrical characteristics of the capacitor are generally unacceptable. Typically, the equivalent series resistance (ESR) of the capacitor is too high for most applications. The separator in an electrolytic capacitor is a major contributor to the total electrical resistance between the anode and cathode. It is thought that polymer separators do not allow sufficient electrolyte to contact the electrodes due to the inherent limited porosity of the polymer comprising the separator.

Thus, the characteristics of a good capacitor separator material are that it be easily assembled between adjacent electrodes in the manufacturing process, have good electrical and mechanical characteristics and have sufficient porosity to be able to absorb the electrolyte and keep the electrolyte in contact with the capacitor electrodes.

It is therefore a feature of the present invention to provide porous polymer containing separators for use in electrolytic electrical devices, the separators capable of absorbing and retaining electrolyte. Another feature of the present invention is to provide a method for making porous polymer containing separators for electrolytic electrical devices. Yet another feature of the present invention is to provide a method for making porous polymer containing separators which comprises loading liquid polymer containing material with at least one compound and at least one modifier material, solidifying the polymer containing material and removing at least some of the compound from the solidified polymer containing material to yield a polymer containing separator capable of absorbing and retaining electrolyte. Another feature is that polymer containing separators may be easily assembled between adjacent electrodes in the manufacturing process. Yet another feature is that polymer containing separators of the present invention provide good electrical characteristics when used in electrolytic devices, especially electrolytic capacitors. A further feature is that electrical devices such as electrolytic capacitors containing porous polymer containing separators according to the present invention generally require less volume than electrical devices containing conventional paper type separators.

These and various other features of this invention as well as many specific advantages will be more fully apparent from a detailed consideration of the remainder of this disclosure including the examples and the appended claims in conjunction with the accompanying drawing in which;

Figure 1:
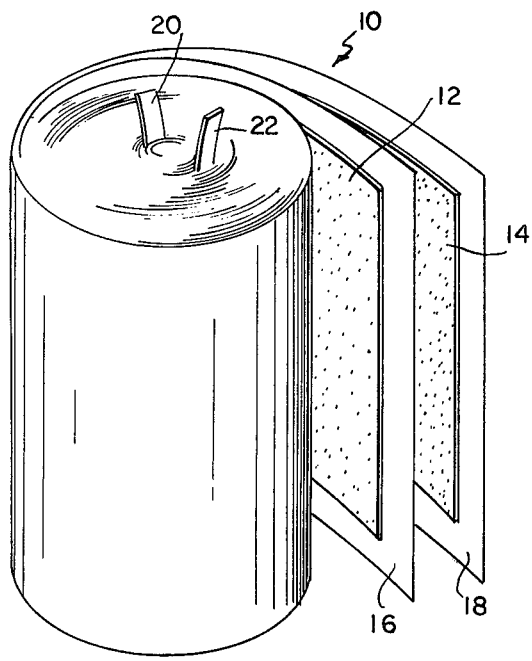
FIG. 1 illustrates a preferred embodiment of the present invention wherein porous polymer containing separators of the sheet or film type are utilized in a convolutely wound electrolytic capacitor cartridge.

Generally, the present invention comprehends the utilization of porous polymer containing separators in electrolytic electrical devices, preferably electrolytic capacitors, the polymer containing a separator capable of absorbing and retaining electrolyte. A method of providing a polymer containing separator capable of absorbing and retaining electrolyte comprises the steps of loading a liquid or semi-liquid polymer containing material with an appropriate compound or compounds, preferably a compound or compounds common to the electrolyte, and a modifier material, solidifying the loaded polymer containing material, and removing at least some of the compound or compounds from the solidified polymer containing material to yield a polymer containing separator capable of absorbing and retaining electrolyte.

The purpose of loading the polymer containing material with a compound or compounds is to help provide a means for creating a porous network of connected voids within the polymer containing separator after solidification. With a network of connected voids, the polymer containing separator is porous and thereby able to absorb and retain electrolyte. The network of voids may be created in a separate step by leaching the compound from the polymer containing separator with a solvent of the compound. However, if the compound is common to the electrolyte to be used in the electrical device, impregnation of the separator with electrolyte solution will dissolve the compound and thereby create the network of voids capable of absorbing and retaining the electrolyte while also providing the solute for the electrolyte. Thus a separate leaching step could be avoided.

The polymer of the polymer containing material may be selected from a wide variety of polymeric materials. The polymer should be electrically insulative and should be substantially unaffected by electrolytes at required operating temperatures. Suitable polymers may include polyvinyl chloride, urethane, cellulose acetate, cellulose triacetate, acrylics, polyimides, polysulfones, polyesters, alkyds, polyolefins such as polyethylene, polypropylene and their copolymers and the like depending upon the electrolyte to be employed.

Preferably, the polymer containing material prior to solidification includes a suitable solvent or solvents of the polymer to aid in application of the material and to facilitate loading of the compound or compounds and modifier material. Some solvents may also tend to increase the porosity of the resultant polymer containing separator. The characteristics of the solvent include that it be easily removed during solidification, that it not harmfully affect the electrical characteristics of the resultant polymer containing separator and preferably, that it also be capable of dissolving the compound or compounds and swell the modifier material loaded in the polymer containing material.

The compound or compounds loaded in the polymer containing material may be selected from a wide variety of inorganic or organic compounds which do not degrade or adversely affect the polymer containing material. Preferably the compound or compounds are common to the electrolyte used in conjunction with the polymer containing separator in an electrical device to avoid a separate leaching step. The general classes of inorganic salts and organic acids are preferred. Suitable compounds include ammonium nitrate, maleic acid, boric acid, ammonium pentaborate and the like.

The compound to be loaded in the polymer containing material need not be soluble in the polymer containing material. The compound may be suspended in the polymer containing material, preferably in a finely divided form. By making the polymer containing material quite viscous, the quantity of compound able to be suspended is increased. The amount of the compound or compounds to be loaded in the polymer containing material is not believed to be critical. Generally the amount to be loaded should be maximized while still retaining the physical integrity of the resultant solidified polymer containing separator. Preferably about 1-2 parts compound by weight are added to one party by weight polymer material.

Along with the compound to be removed or dissolved from the polymer containing separator to help provide the network of connected voids, the polymer containing material is also loaded with a modifier material. The modifier material may also be dissolved or suspended in the polymer containing material. The primary functions of the modifier material in the polymer containing separator are to absorb electrolyte and preferably to provide a controlled swelling of the polymer containing separator after impregnation with an electrolyte. The latter function helps to fill most if not all gaps between adjacent electrodes and thereby helps to insure good electrolyte contact with all portions of the electrodes. The degree of swelling should be controlled so as not to result in the separator being forced out of the space between adjacent electrodes. Some modifier materials also improve the adhesiveness and degree of flexibility of the polymer containing separator. For aqueous type electrolytes, a hydrophilic modifier material such as starch, starch copolymers, sulfonates, some silicates, or combinations thereof may be used. For organic type electrolytes, modifier materials which swell to some degree without dissolving such as cellulose acetate(s), ethyl cellulose, urethanes, polystyrenes, certain acrylics or combinations thereof may be used. Modifier materials may also impart greater strength to the polymer containing separator. It should be understood that the modifier material should not be removed in the step of removing at least some of compound from the solidified polymer containing material nor should the filler type material be significantly dissolved by the electrolyte. If the modifier material is too soluble in the operating electrolyte, the modifier material may enter the pore structure of the electrodes and cause a degradation of electrical characteristics such as high equivalent series resistance (ESR) in electrolytic capacitors. The modifier type material should also not degrade the polymer containing material and the operating electrolyte. Typically, the amount of modifier material included will be about 3-50% by weight of the polymer material.

Preferably the step of solidifying the loaded polymer containing material takes place while the polymer containing material is over an electrode. Thus the solidifed polymer containing material will adhere to some degree to the electrode and thereby facilitate assembly of the electrode and polymer containing separator into an electrical device. The loaded polymer containing material may be applied to an electrode by a variety of methods. These methods include dipping, rolling, brushing and the like. If the loaded compound or compounds and modifier material are soluble in the polymer containing material, spraying onto the electrodes is possible. The polymer containing separator of the present invention may be applied to an anode electrode or a cathode electrode or both in an electrolytic capacitor. Preferably the polymer containing material is applied to the cathode electrode. Also the polymer containing separator may be formed into a discrete sheet or film and then placed between adjacent electrodes in the assembly of an electrical device. The polymer containing separator may be annealed after solidification to improve the strength of the separator. The thickness of the polymer containing separator is not critical, and for most applications, the required thickness of a polymer containing separator according to the present invention is less than that required for paper type separators. Generally the thickness of the polymer containing separator for electrolytic capacitor use is between about 0.5 to about 2.5 mils. For many polymer materials, the thickness and surface texture of the resultant polymer containing separator are dependent upon the temperatures of the loaded polymer-solvent mixture during application. Higher temperatures may result in smoother, thinner separators while lower temperatures produce thicker separators. The separator texture may be affected by the solvating strength of the solvent used to dissolved the polymer. Poor solvents tend to produce coarse separators.

The loaded polymer containing material may also be used in conjunction with a paper type separator to form a composite type separator. In this composite type separator, a paper type separator is impregnated with a loaded polymer containing material and then solidified. Techniques for applying the loaded polymer containing material to the paper type separator are generally the same as those for applying the loaded polymer containing material to an electrode. The loaded polymer containing material tends to fill void defects and partially encase or mask impurity or particle type defects in the paper type separators, while still allowing electrolyte to be in contact with the electrodes. One such composite type separator is usually able to take the place of several layers (typically 2-3 layers) of conventional paper type separators and still achieve comparable electrical characteristics. Thus capacitors utilizing these composite separators may have a significantly reduced volume and their manufacture is facilitated as fewer separators are required to be assembled. For most applications, however, use of the polymer containing material on a paper type separator or as a discrete sheet or film is not as desirable as utilizing the polymer containing material by applying it directly to an electrode.

Methods for solidifying or curing the liquid or semi-liquid loaded polymer containing material generally depend upon the type of polymer utilized. Methods may include heat, irradiation such as UV light or electron beam and the like. Where solvents are used in preparing the loaded polymer containing material, some type of heat treatment is generally used to volatilize the solvent.

Electrolytes that may be utilized in electrolytic capacitors containing the porous polymer containing separators of the present invention generally depend upon the type of polymer used. The electrolyte should be non-reactive with the polymer and should not dissolve the polymer. Conventional electrolytes generally comprise an ionizable compound in a solvent or solvents. Examples of various electrolytes for use in electrolytic capacitors are given in U.S. Pat. No. 3,719,602. The most common electrolytes for aluminum type capacitors utilize a solvent base of either etylene glycol, ethylene glycol monomethyl ether or dimethylformamide depending upon the particular capacitor application. In the present invention, preferred polymers for use with ethylene glycol monomethyl ether based electrolytes include cellulose triacetate, polyethylene, polypropylene and polyvinyl chloride; with dimethylformamide based electrolytes include polyethylene and polypropylene; and with ethylene glycol based electrolytes include cellulose acetate, cellulose triacetate, polyethylene, and polypropylene and polyvinyl chloride. Preferred modifier materials for ethylene glycol monomethyl ether based electrolytes include cellulose acetate; for dimethylformamide based electrolytes include polymethyl methacrylate, cellulose triacetate and polystyrene; and for ethylene glycol based electrolytes include starch, methylvinyl ether and maleic anhydride copolymer and starchpolyacrylonitrile graft copolymer.

Referring now to FIG. 1, there is shown convolutely wound capacitor cartridge 10 comprising a pair of electrode foils 12 and 14 of suitable metals, such as aluminum, and separated from each other by porous polymer containing separator sheets or films 16 and 18 made according to the present invention. Porous polymer containing separator sheets 16 and 18 may be primarily porous polymer material or porous polymer coated paper. Termination means 20 and 22 provide external electrical connection for electrode foils 12 and 14. As shown in the drawing, sheets 16 and 18 have a greater width than foils 12 and 14. To make an operable capacitor, cartridge 10 is impregnated with an electrolyte and encased in a suitable housing (not shown).

Figure 2:
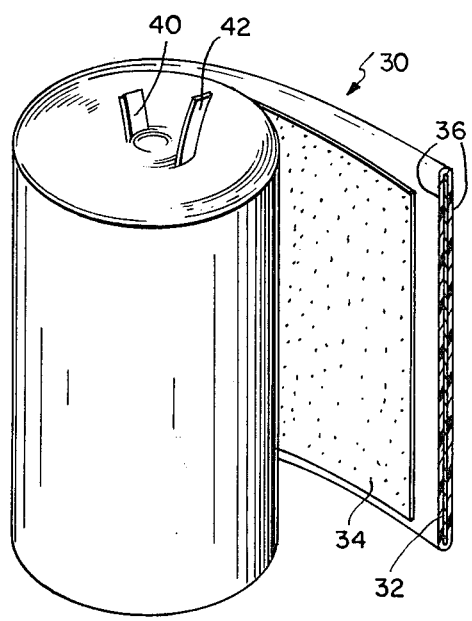
FIG. 2 illustrates another preferred embodiment wherein porous polymer containing separators are over the electrode foils of a convolutely would electrolytic capacitor cartridge.

FIG. 2 shows an alternate embodiment of the present invention wherein the porous polymer containing separator is over an electrode. Here cartridge 30 comprises a pair of electrode foils 32 and 34 of suitable metals. Over foil 32 is the porous polymer containing separator 36 of the present invention. Note foil 32 is completely encased by porous polymer containing separator 36. It should be realized that the porous polymer containing separator 36 could be over both electrode foils. In a preferred embodiment, the porous polymer containing separator 36 is over the cathode electrode foil. Termination means 40 and 42 provide external electrical connection for electrode foils 32 and 34. Cartridge 30 is made an operable capacitor as was explained with reference to the cartridge 10 of FIG. 1.

Figure 3:
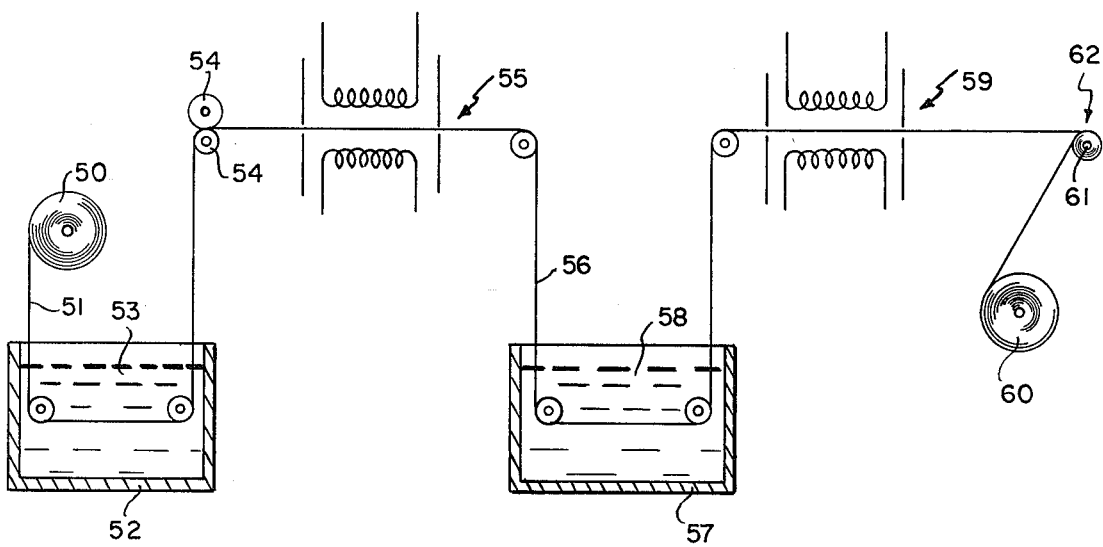
FIG. 3 is a diagrammatic illustration of an appartus for making porous polymer containing separators over electrode foils for use in an electrolytic device.

FIG. 3 illustrates in diagrammatic form one method for making the porous polymer containing separators of the present invention. A roll 50 of electrode foil 51 is unwound and immersed in bath 52 containing liquid polymer containing material 53 including compounds and modifier material. The polymer containing material 53 adheres to both sides of the foil 51 after emerging from the bath 52. Rollers 54 may be used to smooth the polymer containing material 53 on the foil 51 to the desired thickness before the foil enters curing zone 55. In curing zone 55, the polymer containing material 53 over the foil 51 is solidified to provide polymer containing separator 56. The foil 51 and separator 56 are then immersed in bath 57 containing a leaching material 58 which removes the compounds from the polymer containing separator 56. The foil 51 and separator 56 then pass through a drying zone 59 and are then convolutely wound with electrode 60 on an arbor 61 to yield a capacitor cartridge 62. The capacitor cartridge 62 is then impregnated with an electrolyte and placed in a housing (not shown) to yield an operable capacitor.

If the compounds loaded in the dissolved polymer containing material 53 are common to the electrolyte to be used, then the steps of immersing the foil 51 in bath 57 and passing the foil through drying zone 59 may not be necessary.

In capacitors utilizing the resultant polymer containing separators of the present invention, the capacitance is generally equal to the capacitance achieved using conventional paper type separators and the same electrolyte. In many situations, the dissipation factor (DF)

and equivalent series resistance (ESR) of capacitors utilizing polymer containing separators are comparable or even lower than that of capacitors utilizing paper type separators. In most present electrolytic capacitor applications, it is important that the DF and ESR be as low as possible. In addition, by utilizing porous polymer containing separators of the present invention in electrolytic capacitors, significant reductions in volume over capacitor utilizing conventional paper separators can be achieved. Volume reductions of up to about 20% or more are possible.

The following examples illustrate various polymer containing separators and methods for making the separators. It should be understood that the examples are given for the purposes of illustration only and the examples are not intended to limit the invention as has heretofore been described.

EXAMPLE I

A porous polymer containing separator compatible with ethylene glycol monomethyl ether based electrolytes is made by loading a polymer containing material with a compound common to certain types of these electrolytes.

A mixture is prepared consisting of about 516 ml. of the solvent methylene chloride, about 320 ml. of the solvent tetrahydrofuran, about 164 ml. of the solvent dioxane, about 45 g. of the polymer cellulose triacetate, about 22 g. of the modifier material cellulose acetate and about 120 g. of the compound maleic acid. The mixture is heated to about 60° C and stirred. The mixture is then applied to an aluminum electrode foil and allowed to dry to yield a polymer containing separator over the electrode foil. The foil with the adhering polymer containing separator is convolutely wound and then impregnated with an electrolyte containing ethylene glycol monomethyl ether. After impregnation, the compound of the separator dissolves in the electrolyte creating a porous separator and the modifier material swells so that the separator fills the volume between adjacent electrodes and an operable electrolytic capacitor is obtained.

EXAMPLE II

Another porous polymer containing separator compatible with electrolytes containing ethylene glycol monomethyl ether is made by loading polymer containing material with a compound common to certain types of these electrolytes.

A mixture is prepared consisting of about 1000 ml. of the solvent tetrahydrofuran, about 106 g. of the polymer polyvinyl chloride, about 60 g. of the modifier material cellulose acetate and about 75 g. of the compound maleic acid, a compound common to the operating electrolyte. After a thorough stirring at an elevated temperature, the mixture is applied to a suitable substrate and allowed to solidify to yield a discrete polymer containing separator film. The film is wound with foil electrodes into a cartridge and impregnated with an electrolyte containing ethylene glycol monomethyl ether to yield an operable capacitor having a porous polymer containing separator.

EXAMPLE III

A porous polymer containing separator compatible with dimethylformamide (DMF) based electrolytes primarily, but also suitable with the other electrolytes discussed herein, is made by loading a polymer containing material with a compound common to certain types of these electrolytes.

A mixture is prepared consisting of about 820 ml of the solvent xylene, about 180 ml of the solvent dioxane, and about 80 g. of the polymer(s) polyethylene or polypropylene or a combination thereof in any proportion.

a. For use with dimethylformamide based or ethylene glycol monomethyl ether based electrolytes about 3 g. of the modifier materials polymethylmethacrylate and/or cellulose acetate and about 12 g. of the compounds maleic acid and boric acid are added to the dissolved polymer mixture.

b. For use with electrolytes containing ethylene glycol about 3 g. of modifier material methyl vinyl ether-maleic anhydride copolymer and/or starch-polyacrylonitrile graft copolymer and about 30 g. boric acid and/or ammonium pentaborate are added to the dissolved polymer mixture.

The mixture is prepared at about 110° with thorough stirring. The mixture is then applied to an aluminum foil electrode and allowed to solidify to yield a polymer containing separator over the foil electrode. The foil electrode with separator is then convolutely wound with another electrode foil and impregnated with the appropriate electrolyte.

EXAMPLE IV

A porous polymer containing separator compatible with electrolytes containing a significant amount of ethylene glycol is made by loading a polymer containing material with a modifier material and a compound not common to these types of ethylene glycol based electrolytes which is subsequently leached from the solidified polymer containing separator.

A mixture is prepared containing about 1000 ml. of the solvent tetrahydrofuran, about 130 g. of the polymer material cellulose acetate, about 150 g. of the modifier material water soluble starch and about 300 g. of the compound ammonium nitrate. The mixture is applied to a flat surface and to the solvent evaporated to yield a solidified polymer containing separator film. The ammonium nitrate is then leached from the separator film and the film dried. The separator film is convolutely wound with foil electrodes and impregnated with an electrolyte containing ethylene glycol, ammonium pentraborate and water to yield an operable capacitor.

EXAMPLE V

A porous polymer containing separator is made according to the procedure of EXAMPLE IV except that a like amount of the polymer polyvinyl chloride is used instead of cellulose acetate.

EXAMPLE VI

A porous polymer containing separator compatible with electrolytes containing a predominate amount of ethylene glycol is made by loading a polymer containing material with a compound common to these types of electrolytes and a modifier material.

A mixture is prepared containing about 1000 ml. of the solvent tetrahydrofuran, about 100 g. of the polymer material cellulose acetate, about 178 g. of starch modifier material, about 40 g. of the modifier material starch polyacrylonitrile graft copolymer, and about 200 g. of the compound ammonium pentaborate. The mixture is applied to an electrode foil and then solidified. The electrode foil with the adhering polymer containing separator is convolutely wound with another electrode foil to yield a capacitor cartridge. The cartridge is impregnated with an ethylene glycol based solution which dissolves the ammonium pentaborate from the polymer containing separator thereby achieving the desired electrolyte composition and increased porosity in the polymer containing separator.

EXAMPLE VII

A further polymer containing separator compatible with ethylene glycol based electrolytes is prepared according to the procedure of EXAMPLE VI except the initial mixture consists of about 930 ml. of the solvent dioxane, about 70 ml. of the solvent ethylene glycol, about 72 g. of the polymer cellulose triacetate, about 7 g. of the polymer cellulose acetate, about 7 g. of the modifier material methyl vinyl ethermaleic anhydride copolymer about 2 g. of the modifier material water soluble starch, about 2 g. of the modifier material polymethyl methacrylate, about 72 g. of the compound boric acid and about 86 g. of the compound ammonium pentaborate.

In all the above examples where the compound loaded in the mixture is common to the electrolyte to be utilized in the capacitor, the composition of the impregnating electrolyte is adjusted accordingly to compensate for the amount of compound which will dissolve in the electrolyte and thereby the desired composition for the capacitor electrolyte is achieved. In some instances, the amount of compound included in the polymer containing separator is sufficent to provide all the compound of the required composition of the electrolyte and therefore the compound need not be included in the impregnating electrolyte.

Electrolytic capacitors containing the porous polymer containing separators of the above examples exhibit important electrical characteristics such as capacitance, DF, ESR and DCL values comparable to that of electrolytic capacitors containing paper type separators. Since the porous polymer containing separators of the present invention need be only about one mil in thickness as compared with about a two mil thickness of paper separators required in conventional electrolytic capacitors, considerable volume reduction can be realized in a capacitor without loss of capacitance.

Thus the present invention comprehends porous polymer containing separators for electrical devices, the separators capable of absorbing electrolyte and methods for making these separators. The separators are particularly useful in electrolytic capacitors such as aluminum electrolytic capacitors to achieve a reduction in capacitor volume.

While the present invention has been described with reference to particular embodiments thereof, it will be understood that numerous modifications may be made by those skilled in the art without actually departing from the spirit and scope of the invention as defined in the appended claims.

We claim:

1. A method of making a polymer containing separator adapted for use in an electrical device, the separator capable of absorbing and retaining electrolyte, comprising the steps of:
   a. loading a dissolved polymer containing material with at least one compound to be leached from said polymer containing separator and at least one modifier material, the modifier material selected from the group consisting of cellulose acetate, starch, starchpolyacrylonitrile graft copolymer polystyrene, polymethyl methacrylate, methylvinyl ether, maleic anhydride copolymer and mixtures thereof,
   b. solidifying the loaded dissolved polymer containing material, and
   c. leaching at least some of said one compound from the solidified polymer containing material to yield said polymer containing separator capable of absorbing and retaining electrolyte.

2. The method of claim 1 wherein the polymer containing material includes at least one polymer dissolved in at least one solvent.

3. The method of claim 2 wherein said one compound is dissolved in solvent.

4. The method of claim 2 wherein the polymer containing material is solidified by removing solvent.

5. The method of claim 1 wherein the polymer is solidified by irradiation.

6. The method of claim 1 further including the step of impregnating the polymer containing separator with electrolyte.

7. The method of claim 1 wherein said polymer containing material includes a polymer selected from the group consisting of polyvinyl chloride, polyethylene, cellulose acetate, cellulose triacetate, urethane, polypropylene and mixtures thereof.

8. The method of claim 1 wherein said one compound is selected from the group consisting of ammonium nitrate, ammonium pentaborate, maleic acid, boric acid and mixtures thereof.

9. The method of claim 1 wherein the polymer containing separator is a discrete film.

10. The method of claim 1 wherein the polymer containing material is solidified over an electrode.

11. The method of claim 13 further including the steps of convolutely winding the said electrode with at least one other electrode.

12. The method of claim 11 wherein said electrode is a foil type electrode containing aluminum.

13. The method of claim 1 wherein the polymer containing material is solidified over paper.

14. The method of claim 13 further including the steps of convolutely winding said polymer containing separator with electrodes.

15. A method of making an electrical device including a polymer containing separator over an electrode, the separator capable of absorbing and retaining electrolyte, comprising the steps of:
   a. loading a dissolved polymer containing material with at least one compound to be dissolved from said polymer containing separator and at least one modifier material,
   b. applying the loaded dissolved polymer containing material to an electrode,
   c. solidifying the loaded dissolved polymer containing material,
   d. contacting the solidified polymer containing material with electrolyte capable of dissolving at least some of the compound to yield said polymer containing separator absorbing and retaining electrolyte.

16. The method of claim 15 further including the step of convolutely winding said electrode with the applied polymer containing material after solidifying the polymer containing material.

17. The method of claim 15 wherein the polymer containing material includes at least one polymer dissolved in at least one solvent.

18. A capacitor comprising at least two electrodes, a porous polymer containing separator having a network of voids and interspersed modifier material between adjacent electrodes, and electrolyte; wherein the separator is formed by loading a dissolved polymer containing material with at least one compound to be dissolved from said porous polymer containing separator and at least one modifier material, applying the loaded dissolved polymer containing material to an electrode, solidifying the loaded dissolved polymer containing material, and contacting the solidified polymer containing material with electrolyte capable of dissolving at least some of said one compound to yield said porous polymer containing separator capable of absorbing and retaining said electrolyte.

19. The capacitor of claim 18 wherein the polymer of the polymer containing separator is selected from the group consisting of polyvinyl chloride, cellulose acetate, urethane, cellulose triacetate and mixtures thereof.

20. The capacitor of claim 19 wherein said one compound is selected from the group consisting of salts, acids and mixtures thereof.

21. The capacitor according to claim 20 wherein said electrodes are aluminum containing foil type electrodes and said electrolyte contains a material selected from the group consisting of ethylene glycol, ethelene glycol monomethly ether and dimethylformamide.

22. In an electrical device of the type having at least two electrodes and electrolyte, the improvement which comprises: a polymer containing separator having a network of voids capable of absorbing and retaining electrolyte, said polymer containing separator formed by loading a dissolved polymer containing material with at least one compound to be leached from said polymer containing separator and at least one modifier material, solidifying the loaded dissolved polymer containing material and leaching at least some of said one compound from the solidified polymer containing material.

* * * * *